US012509647B2

(12) United States Patent
Sun et al.

(10) Patent No.: US 12,509,647 B2
(45) Date of Patent: Dec. 30, 2025

(54) DETERGENT TABLET

(71) Applicant: Guangzhou Joyson Cleaning Products Co., Ltd., Guangdong (CN)

(72) Inventors: Jianfeng Sun, Guangdong (CN); Fenglei Li, Guangdong (CN); Min Sun, Guangdong (CN); Xiangjian Zeng, Guangdong (CN); Na Lan, Guangdong (CN); Yumei Huang, Guangdong (CN)

(73) Assignee: Guangzhou Joyson Cleaning Products Co., Ltd., Guangdong (CN)

( * ) Notice: Subject to any disclaimer, the term of this patent is extended or adjusted under 35 U.S.C. 154(b) by 412 days.

(21) Appl. No.: 18/107,569

(22) Filed: Feb. 9, 2023

(65) Prior Publication Data

US 2024/0209294 A1 Jun. 27, 2024

Related U.S. Application Data

(63) Continuation of application No. PCT/CN2022/140598, filed on Dec. 21, 2022.

(51) Int. Cl.

*C11D 17/00* (2006.01)
*C11D 1/831* (2006.01)
*C11D 3/00* (2006.01)
*C11D 3/10* (2006.01)
*C11D 3/12* (2006.01)
*C11D 3/20* (2006.01)
*C11D 3/22* (2006.01)
*C11D 3/33* (2006.01)
*C11D 3/34* (2006.01)
*C11D 3/37* (2006.01)
*C11D 1/14* (2006.01)
*C11D 1/22* (2006.01)
*C11D 1/28* (2006.01)
*C11D 1/29* (2006.01)
*C11D 1/72* (2006.01)
*C11D 1/74* (2006.01)

(52) U.S. Cl.

CPC .......... *C11D 17/0086* (2013.01); *C11D 1/831* (2013.01); *C11D 3/001* (2013.01); *C11D 3/0021* (2013.01); *C11D 3/0094* (2013.01); *C11D 3/10* (2013.01); *C11D 3/126* (2013.01); *C11D 3/2044* (2013.01); *C11D 3/2079* (2013.01); *C11D 3/221* (2013.01); *C11D 3/225* (2013.01); *C11D 3/33* (2013.01); *C11D 3/349* (2013.01); *C11D 3/3753* (2013.01); *C11D 3/3776* (2013.01); *C11D 3/3796* (2013.01); *C11D 1/143* (2013.01); *C11D 1/22* (2013.01); *C11D 1/28* (2013.01); *C11D 1/29* (2013.01); *C11D 1/721* (2013.01); *C11D 1/74* (2013.01); *C11D 2111/12* (2024.01)

(58) Field of Classification Search

CPC ..... C11D 17/0086; C11D 1/831; C11D 3/001; C11D 3/0021; C11D 3/0094; C11D 3/10; C11D 3/126; C11D 3/2044; C11D 3/2079; C11D 3/221; C11D 3/225; C11D 3/33; C11D 3/349; C11D 3/3753; C11D 3/3776; C11D 3/3796; C11D 2111/12; C11D 1/143; C11D 1/22; C11D 1/28; C11D 1/29; C11D 1/721; C11D 1/74

See application file for complete search history.

(56) References Cited

U.S. PATENT DOCUMENTS

| | | | | |
|---|---|---|---|---|
| 6,951,838 | B1 * | 10/2005 | Weuthen | C11D 3/06 510/294 |
| 2003/0232735 | A1 * | 12/2003 | Cao | C11D 1/74 510/334 |
| 2014/0038878 | A1 | 2/2014 | O'Connell et al. | |
| 2019/0367841 | A1 | 12/2019 | Panandiker et al. | |
| 2022/0119738 | A1 * | 4/2022 | Demoulin | B01J 13/16 |

FOREIGN PATENT DOCUMENTS

| | | | | | |
|---|---|---|---|---|---|
| CN | 102533708 | A | | 7/2012 | |
| CN | 105283534 | A | | 1/2016 | |
| JP | H04253800 | A | | 9/1992 | |
| JP | 2002180098 | A | | 6/2002 | |
| JP | 2002294297 | A | | 10/2002 | |
| JP | 2012240988 | A | * | 12/2012 | |
| JP | 2013028551 | A | * | 2/2013 | |
| KR | 102095348 | B1 | * | 3/2020 | C11D 3/0084 |
| WO | 2012076186 | A2 | | 6/2012 | |
| WO | WO-2020232464 | A1 | * | 11/2020 | C11D 3/2003 |
| WO | WO-2021228840 | A1 | * | 11/2021 | C11D 3/502 |

OTHER PUBLICATIONS

First Office Action received in corresponding UAE patent application No. P2025-00006, dated Aug. 2, 2025, 7 pages.
Second Office Action received in corresponding Canadian patent application No. 3189688, dated May 28, 2025, 4 pages.
First Office Action received in corresponding Canadian patent application No. 3,189,688, dated May 17, 2024, 7 pages.

* cited by examiner

*Primary Examiner* — Angela C Brown-Pettigrew
*Assistant Examiner* — Brittany Sharon Harris
(74) *Attorney, Agent, or Firm* — Cooper Legal Group, LLC

(57) ABSTRACT

Disclosed in the present application is a detergent tablet, including the following components by weight: 8-34 parts of water-soluble polymer; 14-50 parts of surfactant; 0.1-50 parts of enzyme preparation; 0.1-50 parts of softener preparation; 1 to 10 parts of foaming agent preparation; and 0-30 parts of molding aids. The enzyme preparation and the softener preparation are inserted on the detergent tablet in a form of solid particles.

8 Claims, No Drawings

DETERGENT TABLET

CROSS-REFERENCE TO RELATED APPLICATION

This application is a continuation of PCT application no. PCT/CN2022/140598, filed on Dec. 21, 2022. The entirety of PCT application no. PCT/CN2022/140598 is hereby incorporated by reference herein and made a part of this specification.

TECHNICAL FIELD

The application relates to the technical field of detergents, and, more particular, to a detergent tablet.

BACKGROUND ART

A solid tablet detergent (detergent tablet) has the advantages of high concentration of effectively active ingredients, storage, transportation and portability. It is increasingly favored and used by young consumers and business travel consumers. However, in spite of these advantages, the conventional solid tablet detergent is not very ideal in terms of the cleaning power that consumers care about, especially for stains such as protein, milk stain, or the like that are difficult to remove in daily life. During a drying process for the detergent tablets, water is evaporated, so that the product is has a low, or even little, content of water, and a high concentration and portability. However, due to a high temperature during the drying, an enzyme preparation with special functions will be deactivated to be weakened in terms of detergent function and even lose the original detergent performance, so that stains such as protein, milk stain, or the like cannot be removed.

In addition, for a detergent tablet added with a liquid enzyme preparation by spraying and smearing, since there is a large amount of water and organic solvent contained in the liquid enzyme preparation itself, adding excessive liquid enzyme preparation will not only dissolve the highly water soluble detergent tablet, but also lead to a sticky and soft detergent tablet, causing poor storage stability for the detergent tablet. Furthermore, in a detergent tablet containing a liquid enzyme preparation, the enzyme preparation is vulnerable to the influence of ambient temperature and humidity, such as high temperature and humidity, when being exposed in the air, or liable to deactivation when being in an overly acidic and alkaline environment. Therefore, such kind of enzyme containing detergent tablets have poor stability and exhibit no high cleaning power, so there is still room for improvement.

Further, there is no softener component added in existing detergent tablets, and a softener has to be added separately to eliminate static electricity on clothes, which increases the complexity of laundry. If an cationic softener component is directly added to the detergent, it will contact the anionic surfactant in the detergent for a long time, so that precipitation occurs due to mutual absorption of heterogeneous charges, which will impair the functions of the softener and the anionic surfactant. Therefore, there is still a need for a detergent tablet in the art that contains a softener component while having the functions of detergency and electrostatic removal.

SUMMARY

In view of this, the present application provides a detergent tablet and a method for preparing detergent tablets. According to the present application, a large amount of enzyme preparations are inserted on the detergent tablets, which can ensure the stability of the enzyme preparations. At the same time, a softener component is incorporated in the detergent tablet according to the invention, and the effects of the softener and the detergent component will not be easily affected by precipitation due to mutual adsorption.

The application provides the following technical solutions.

In a first aspect, the present application provides a detergent tablet, including the following components by weight:

8-34 parts of water-soluble polymer;

14-50 parts of surfactant;

0.1-50 parts of enzyme preparation;

0.1-50 parts of softener preparation;

1 to 10 parts of foaming agent preparation; and 0-30 parts of molding aids, wherein the enzyme preparation and the softener preparation are inserted on the detergent tablet in a form of solid particles.

In some embodiments, an amount of water-soluble polymer in the detergent tablets is preferably 9-33 parts, 10-32 parts, 11-31 parts, 12-30 parts, 13-29 parts, 14-28 parts, 15-27 parts, 16-26 parts, 17-25 parts, 18-24 parts, 19-23 parts, 20-22 parts or 21 parts, including any value and range therebetween.

In some embodiments, an amount of the surfactant in the detergent tablets is preferably 16-48 parts, 18-46 parts, 20-44 parts, 22-42 parts, 24-40 parts, 26-38 parts, 28-36 parts, 30-34 parts or 32-33 parts, including any value and range therebetween.

In some embodiments, an amount of the enzyme preparation in the detergent tablets is preferably 0.5-50 parts, 1-50 parts, 2-48 parts, 4-46 parts, 6-44 parts, 8-42 parts, 10-40 parts, 12-38 parts, 14-36 parts, 16-34 parts, 18-32 parts, 20-30 parts, 22-28 parts, or 24-26 parts, including any value and range therebetween.

In some embodiments, an amount of the softener preparation in the detergent tablets is preferably 0.5-50 parts, 1-50 parts, 2-48 parts, 4-46 parts, 6-44 parts, 8-42 parts, 10-40 parts, 12-38 parts, 14-36 parts, 16-34 parts, 18-32 parts, 20-30 parts, 22-28 parts, or 24-26 parts, including any value and range therebetween.

In some embodiments, an amount of the foaming agent preparation in the detergent tablet is preferably 2-9 parts, 3-8 parts, 4-6 parts or 5 parts, including any value and range therebetween.

In some embodiments, an amount of the molding aid in the detergent tablets is preferably 1-28 parts, 3-26 parts, 5-24 parts, 7-22 parts, 9-20 parts, 11-18 parts, 13-16 parts or 14-15 parts, including any value and range therebetween.

In some embodiments, the water-soluble polymer is one or more selected from a group consisting of polyvinyl alcohol, polyvinylpyrrolidone, gelatin, carrageenan, polycrosslinked acrylate, water-soluble polyacrylamide, polymer of vinyl acetate and vinyl alcohol, starch, dextrin, polysaccharide, cellulose, modified cellulose, and microcrystalline cellulose.

In some embodiments, the water-soluble polymer includes polyvinyl alcohol (PVA), polyvinyl pyrrolidone (PVP), hydroxypropyl methyl cellulose (HPMC) and/or hydroxyethyl cellulose (HEC).

In some embodiments, the polyvinyl alcohol may be unmodified or modified, such as carboxylated or sulfonated, or may be a copolymer of vinyl alcohol or vinyl ester monomer and one or more other monomers. Preferably, PVA is partially or completely alcoholized or hydrolyzed. For example, about 40% to 100%, preferably about 50% to about 95%, more preferably about 80% to about 92% of PVA can be asqlcoholized or hydrolyzed. It is known that the degree of hydrolysis affects the temperature at which PVA begins to dissolve in water. For example, 88% hydrolysis corresponds to PVA solution soluble in cold (i.e. room temperature) water, while 90% or more hydrolysis corresponds to PVA solution soluble in warm water (hot water). The average molecular weight (MW) of the polyvinyl alcohol is between 20000 and 120000, and the average degree of polymerization (DP) is between 500 and 2500. More preferably, the average molecular weight of polyvinyl alcohol is between 25000 and 100000, and the average degree of polymerization (DP) is between 550 and 2000.

In some embodiments, the polyvinyl pyrrolidone (PVP) can be prepared by bulk polymerization, solution polymerization and other methods from a monomer vinyl pyrrolidone, in the form of homopolymer, copolymer, cross-linked polymer, non-ionic, cationic and anionic polymer. It is preferably any of non-ionic type and anionic type, or a combination thereof. It is more preferably non-ionic polyvinylpyrrolidone. Preferably, it is a complex of nonionic polyvinylpyrrolidone and PVA with an average molecular weight of 5000 to 1000000, a K value of 15 to 90, and more preferably a mean molecular weight of 8000 to 400000, and a K value of 15 to 60.

In some embodiments, the hydroxypropyl methyl cellulose (HPMC) or/and hydroxyethyl cellulose (HEC) are synthetic or semi-synthetic inactive viscoelastic polymers. A combined use with the polyvinyl alcohol can serve a function of protect colloid, so as to facilitate the film-forming property of polyvinyl alcohol, reduce the use amount of polyvinyl alcohol, increase the use amount of surfactant, and improve the effective content of a concentrated product, thereby achieving a good cleaning effect at a small use amount.

In some embodiments, the surfactant is one selected from a group consisting of an anionic surfactant and a non-ionic surfactant, or a combination thereof.

In some embodiments, the surfactant is a composition of an anionic surfactant and a nonionic surfactant mixed in a weight ratio of 10:1-6.

In some embodiments, the anionic surfactant can be selected from a sulfate compound that sulfates alkenes, such as alkylbenzene sulfonate α-alkyl sulfonates and non-alkoxylated C6-C20 linear or branched alkyl sulfates after direct sulfation and neutralization of fatty acids with alkali, such as dodecylbenzene sulfonates (LAS) α-olefin sulfonates (AOS), dodecyl sulfates (SLS), secondary alkane sulfonates (SAS) and fatty acid methyl ester sulfonates (MES), as well as C6-C20 linear or branched alkyl alkoxy sulfates with 0.1 to 10 heavy alkoxy degrees, preferably C10-C16 linear or branched alkyl alkoxy sulfates with about 1 to about 5 heavy alkoxy degrees, such as dodecyl polyether sulfate (AES), but not limited thereto.

In some embodiments, the non-ionic surfactant can be C6-C20 alkyl alkoxylated alcohols with a 5 to 15 degree of heavy alkoxylation, including fatty alcohol, isomeric alcohol polyoxyethylene ether, polyoxyethylene ether, alkylphenol polyoxyethylene ether, fatty acid polyoxyethylene ester, lipid ethoxylate, alkanolamide, ethylene oxide, propylene oxide, polyether, polyol ester ether, or the like. Representative examples include fatty alcohol polyoxyethylene ether, polyoxyethylene alkylphenyl ether, polyoxyethylene alkyl ether, polyoxyethylene polyoxypropylene block copolymer, polyethylene glycol fatty acid ester, polyoxyethylene sorbitan fatty acid ester, cocoamide monomethylamine, cocoamide dimethylamine, cocoamide monoethanolamine, cocoamide diethanolamine, fatty acid alkanolamide, alkyl polyglucoside, methylpolyethylene alkyl ether glucoside polyoxyethylene ether, fatty acid methyl ester ethoxylate, etc., but not limited to thereto.

In some embodiments, the enzyme preparation is one or more selected from a group consisting of protease, amylase, lipase, cellulase, mannanase, pectin lyase, papain, oxidoreductase, and glycoside hydrolase.

In some embodiments, the enzyme preparation can be a commercially available solid enzyme preparation, such as solid-phase concentric enzyme (article number DX01™: a complex of protease and cellulase), solid-phase protease (article number: KELIJING 12.0T™), solid-phase cellulase (article number: KELIJING C2000™) from KDN Biotech Group, solid-phase cellulase (article No. CAREAYME PREMIUM 5000T™, article No. CELLUCLEAN 4500T™), solid-phase amylase (article No. STAINZYME PLUS EVITY 12T™), and solid-phase protease Savinase series (SAVINASE 4.0T™/SAVINASE 6.0T™/SAVINASE 8.0T™/SAVINASE 12T™/SAVINASE 24T™) from Novozymes.

The enzyme preparation can be, for example, a particle coated with alkaline protease and its preparation method disclosed in China patent publication no. CN102533708A, or an enzyme particle prepared in a granular enzyme composition disclosed in China patent publication no. CN105283534A, but not limited to thereto.

In some embodiments, particles of the enzyme preparation have an average particle size of 0.01 mm-3.0 mm.

In some embodiments, the particles of the enzyme preparation have an average particle size of 0.05 mm-2.8 mm, 0.1 mm-2.5 mm, 0.1 mm-2.0 mm, 0.5 mm-2.0 mm, 1 mm-2.0 mm or 1.5 mm-1.8 mm, including any value and range therebetween them, but not limited thereto.

In some embodiments, the softener preparation includes one or more selected from a group consisting of cationic softener, anionic softener, non-ionic softener, amphoteric quaternary ammonium salt softener, organosilicon softener, polyethylene glycol/polypropylene glycol, and molding aid.

In some embodiments, particles of the softener preparation have an average particle size of 0.01 mm-3.0 mm.

In some embodiments, particles of the softener preparation have an average particle size of 0.05 mm-2.8 mm, 0.1 mm-2.5 mm, 0.1 mm-2.0 mm, 0.5 mm-2.0 mm, 1 mm-2.0 mm or 1.5 mm-1.8 mm, including any value and range therebetween them, but not limited thereto.

In some embodiments, the softener preparation includes cationic softener, polyethylene glycol/polypropylene glycol, and molding aid.

In some embodiments, the softener preparation includes cationic softener, silicone softener, polyethylene glycol/polypropylene glycol, and molding aid.

In some embodiments, the softener preparation includes cationic softener, natural or synthetic cationic cellulose polymer softener, polyethylene glycol/polypropylene glycol and molding aid. In particular, a cationic softener can be one or more selected from a group consisting of alkyl dimethyl ammonium chloride, alkyl imidazoline salt, alkyl amido quaternary ammonium salt and ester quaternary ammonium salt compound. The natural or synthetic cationic cellulose polymer softener is one or more selected from a group consisting of guar gum hydroxypropyl trimethyl ammonium chloride, hydroxypropyl guar gum hydroxypropyl trimethyl ammonium chloride, chitosan, polyquaternary ammonium salt-10, polyquaternary ammonium salt-6, polyquaternary ammonium salt-7, polyquaternary ammonium salt-39 and polyquaternary ammonium salt-6. Among the series of polyquaternary ammonium salts, polyquaternary ammonium salt-10 is preferable.

In some embodiments, the organosilicon softener is one or more selected from a group consisting of dimethylsiloxane, polydimethylsiloxane, amino-modified polysiloxane, polyether-modified siloxane, amino-polyether modified siloxane, epoxy-polyether-modified polysiloxane and linear block polyether-modified polysiloxane.

In some embodiments, the molding aid can be water-soluble, insoluble organic matter, inorganic salt, etc. Specifically, the molding aid is one or more selected from a group consisting of bentonite, kaolin, sodium sulfate, neutral sodium silicate, sodium pyrophosphate, sodium borate, talc, silica, 4A zeolite, starch, cellulose, dextrin and polysaccharide.

In some embodiments, a weight average molecular weight of the polyethylene glycol/polypropylene glycol is between 2000 and 2000.

In some embodiments, a weight average molecular weight of the polyethylene glycol/polypropylene glycol is 3000-20000, 4000-18000, 5000-15000, 6000-13000, 7000-12000, 8000-11000, and 9000-1000, including any value and range therebetween.

In some embodiments, the softener preparation includes the following components by weight:

3-60 parts of polyethylene glycol/polypropylene glycol;

1-60 parts of cationic softener;

or/and 1-10 parts of silicone softener;

1-90 parts of bentonite;

1-50 parts of starch; and 1-10 parts of dextrin.

In some embodiments, it can be prepared by a method selected from a group consisting of fluidized bed spray drying method, pressure spray drying method, airflow spray drying method, vertical scraper film drying method, turbulent tube drying method, horizontal scraper film flash drying method, and drum drying method, but not limited thereto.

In some embodiments, the foaming agent preparation is a mixture of anionic surfactant, zwitterionic surfactant, non-ionic surfactant and water. Specifically, the foaming agent preparation is a mixture of at least one selected from a group consisting of potassium lauryl alkoxide, sodium lauryl benzene sulfonate TEA salt, sodium lauryl alcohol polyether sulfate, triethanolamine salt of polyoxyethylene alkyl ether phosphate, alkyl glycoside with a carbon chain of C8-C16, C10-C16 alkanolamide, fatty acid monoethanolamine and diethanolamine, alkyl dimethyl oxide amine, alkyl acylpropyl betaine, cocoamide propyl hydroxysulfonyl betaine, alkyl amide amphoteric sodium acetate, and C12-C16 olefin sulfonate with deionized water or distilled water with a conductivity of <10 us/cm.

In some embodiments, the foaming agent preparation includes the following components by weight:

1-4 parts of potassium laurate;

6-14 parts of dodecylbenzene sulfonate TEA salt;

2-8 parts of C12-C16 olefin sulfonate;

5 to 11 parts of polyoxyethylene alkyl ether phosphate triethanolamine salt;

6-14 parts of alkyl glycosides;

2-6 parts of cocoamide propyl hydroxysulfobetaine; and 30-90 parts of deionized water.

In some embodiments, the foaming agent preparation can be prepared by adding 60.5 parts of deionized water/distilled water into a stirring pot, adding 2.5 parts of potassium laurate, 10 parts of dodecylbenzene sulfonate TEA salt, 5 parts of C12-C16 alkenesulfonate, 8 parts of polyoxyethylene alkyl ether phosphate triethanolamine salt, 10 parts of C12-C16 alkyl glycoside, and 4 parts of cocoamide propyl hydroxysulfonate betaine, stirring to dissolve evenly to obtain the foaming agent preparation.

In some embodiments, the detergent tablet further includes one or more selected from a group consisting of dye inhibitor, essence, glycerin, propylene glycol, butanediol, pentyl glycol, mannitol, hydroxyethyl urea, glycerol glucoside, tetrasodium glutamate diacetate, sodium bicarbonate, sodium iminodisuccinate, sodium polyaspartate, sodium polyepoxysuccinate and trisodium methylglycine diacetate.

In some embodiments, the dye inhibitor is one or more selected from a group consisting of cationic dye inhibitor, non-ionic dye inhibitor and inorganic salt fixing agent. Specifically, it is one or more selected from a group consisting of imidazoline type, quaternary ammonium salt type, fatty polyamine derivatives, inorganic salts (such as bentonite), cellulose type cationic dye inhibitors, and non-ionic dye inhibitors of polyvinyl pyrrolidone or modified vinyl pyrrolidone/vinyl imidazole copolymer type. It is preferably a mixture of polyvinylpyrrolidone with one or more selected from a group consisting of modified vinylpyrrolidone/vinylimidazole copolymer, fatty polyamine derivatives and polyquaternary ammonium salt cellulose. It is more preferably a combination of polyvinyl pyrrolidone and modified vinyl pyrrolidone/vinyl imidazole copolymer (10:1-10).

In some embodiments, the detergent tablet further includes a foam promoter with foaming effect, which can be selected from a group consisting of an inorganic foam promoter and an organic foam promoter. The inorganic foam promoter can be any one or a mixture of two selected from a group consisting of sodium carbonate and sodium bicarbonate.

In some embodiments, particles of the enzyme preparation and softener preparation of the present invention can be spherical, rod-shaped, plate-shaped, tubular, square, rectangular, disk-shaped, star-shaped, or regular or irregularly shaped flakes.

In a second aspect, the present application provides a method for preparing detergent tablets, including the following steps:

1) dissolve water-soluble polymer in deionized water to produce film-forming sheet solution for detergent tablets;

2) adding a surfactant, foaming agent preparation components and/or molding aids, stirring and mixing evenly, heating and drying to obtain semi-solid sheet;

3) distributing the enzyme preparation and softener preparation in the form of solid particles on continuously heated semi-solid sheet prepared in step 2), and then drying to form the detergent tablet.

To sum up, this application can achieve at least one of the following beneficial technical effects.

1. The detergent tablets in the present application have high content of enzyme and softener preparations, and obvious advantages in terms of detergency and anti-static ability. Due to its high enzyme content, it has excellent cleaning effect for protein, milk and blood stains that are difficult to remove in daily life. It is not only suitable for clothes, but also for a dishwasher for clean tableware. Due to the high content of softener preparation, the detergent tablets of the application can achieve dual effects of washing and cleaning and softening clothes at the same time.

2. The present application is based on the non-volatile stability of solid enzyme preparation. The solid enzyme preparation and wrapped softener components are added to the continuously drying detergent tablets through mechanical transmission, so that the solid enzyme preparation and the wrapped softener components can be added in the maximum amount while drying, avoiding the stability of the detergent tablets from being affected by temperature and humidity environment. The solid phase enzyme preparation and solid phase softener preparation can be more stably adsorbed on the dry tablets, and meet the requirements of non-plastic packaging, reduce white pollution, and comply with the requirements of environmental protection. In addition, the amount of solid phase enzyme preparation and wrapped solid phase softener preparation can be flexibly controlled by adjusting the mechanical speed through frequency conversion, and the added amount can be flexibly set according to different washing objects, which is suitable for mass production.

3. The combined use of foaming agent preparation and detergent components increases volume of a slurry, reduces its density and weight, and loses its internal structure during the production process. Therefore, a flaky detergent slurry can be quickly dried during the preparation, so as to reduce and avoid the influence of drying temperature on the stability of the solid phase enzyme preparation and the wrapped solid phase softener preparation. Meanwhile, reduced density, light weight and loose internal structure of the slurry not only makes it easier to add a large amount of enzyme preparation components to the slurry that is continuously dried, but also makes the solid enzyme preparation and solid phase softener preparation more closely adsorbed on the sheet after the water is continuously evaporated, which is not easy to fall off, and forms a stable detergent sheet with high detergency and flexibility.

4. In addition, the use of foaming agent preparation and foaming agent makes the internal structure of the slurry loose, so that the molecular chain of the water-soluble polymer forming the film in the slurry containing water is easy to be broken or unchained, so that the addition of auxiliary ingredients in the functional detergent tablet composition will not affect the stability and anti-falling-off performance of the detergent particle composition and the solid phase softener preparation. At the same time, the addition of additives not only helps to make the slurry easier to dry, but also reduces the moisture content of the dried detergent tablet, and helps to increase the stability of the detergent tablet for storage due to its low moisture content.

5. Owing to high molecular weight of polyethylene glycol/polypropylene glycol, the polyethylene glycol/polypropylene glycol and the cationic softener components encapsulated by them can be slowly dissolved, and thus a mutual influence caused by precipitation due to electrostatic adsorption with strong anion detergent components in the first washing procedure can be avoided. After the tablets containing anionic detergent ingredients and the immobilized enzyme preparations are dissolved to wash clothes, the polyethylene glycol/polypropylene glycol and the encapsulated cationic softener ingredients begin to be dissolved in a rinsing procedure and release the cationic softener ingredients to contact the clothes. It can not only neutralize residual anionic detergent on clothes in time, but also make clothes cleaned by the detergent quickly repaired by the softener. It can really achieve the effect of washing, cleaning, protecting and softening clothes.

DETAILED DESCRIPTION

Technical solutions of the application will be further described in details below in combination with the drawings and embodiments. Embodiments are merely provided for explaining the present application, not intended to limit the application thereto.

Unless otherwise specified, materials used in the embodiments can be commercially available. Where specific operation steps, experimental conditions, and instruments or devices as used are not indicated in the embodiments, operation steps, experimental conditions, instruments or devices commonly used in the art can be adopted by those skilled in the art, which are within the scope of the application.

Preparation Example

Enzyme Preparation Particles

The enzyme preparations used in examples of the present application and comparative examples are enzyme preparation A: immobilized concentric enzyme under product number DX01™, which is a complex of protease and cellulase purchased from KDN Biotech Group; and enzyme preparation B: immobilized protease SAVINASE 8.0T-™ purchased from Novozymes.

Preparation of Softener Particles particles of the softener preparation used in examples of the present application and comparative examples are prepared as follow: heating 40 kg of polyethylene glycol/polypropylene glycol in a heating pot with a stirrer to a liquid state, adding 40 kg of cationic softener, 5 kg of silicone softener, 45 kg of bentonite, 25 kg of starch, 5 kg of dextrin into the pot sequentially, stirring and mixing evenly, and forming an irregular solid softener preparation by extrusion cooling or spray drying.

Preparation of Foaming Agent Preparation

The foaming agent preparation used in examples of the present application and comparative examples are prepared as follow: adding 60.5 kg of deionized water/distilled water into a stirring pan, adding 2.5 kg of potassium laurate, 10 kg of TEA salt of dodecyl benzene sulfonate, 5 kg of C12-C16 olefin sulfonate, 8 kg of polyoxyethylene alkyl ether phosphate triethanolamine salt, 10 kg of C12-C16 alkyl glucoside, and 4 kg of coconut amidopropyl hydroxysulfobetaine sequentially, and stirring to dissolve to obtain the foaming agent preparation.

EXAMPLES

Example 1

This example provided a detergent tablet including the following components:

8 kg of water soluble polymer (in particular, 6 kg of PVA, 1 kg of PVP and 1 kg of HPMC); 14 kg of surfactant (in particular, 12 kg of SDS and 2 kg of fatty alcohol polyoxyethylene ether AEO9); 2 kg of enzyme preparation; 2 kg of softener preparation; 1 kg of foaming agent preparation; 5 kg of molding aid; 0.1 kg of dye inhibitor; 1 kg of tetrasodium glutamate diacetate;

0.2 kg of essence; 0.2 kg of sodium bicarbonate; and 3 kg of glycerin.

The detergent tablet in this example was prepared as follows:

1) dissolve 8 kg of water-soluble polymer in 50 kg of deionized water, heating to 80° C.-90° C., and stirring evenly to obtain a film forming solution;

2) adding 14 kg of the surfactant, 1 kg of the foaming agent preparation components, 5 kg of molding aid (in particular, starch/bentonite), 0.1 kg of dye inhibitor, 1 kg of tetrasodium glutamate diacetate, 0.2 kg of essence, and 0.2 kg of sodium bicarbonate and 3 kg of glycerol sequentially into the solution, stirring, heating and drying to obtain a semi-solid tablet; and 3) arranging the enzyme preparation in the form of 2 kg solid particles and the softener preparation in the form of 2 kg solid particles prepared in the preparation example on the semi-solid tablet prepared in step 2), and drying to form the detergent tablet.

Examples 2-8

According to the compositions of the detergent tablets of individual examples in Table 1, the detergent tablets of Examples 2-8 were prepared according to the method provided in Example 1.

Comparative Examples 1-2 and 5-6

According to the compositions of detergent tablets of individual comparative examples in Table 2, the detergent tablets in Comparative Examples 1-2 and 5-6 were prepared according to the method provided in Example 1.

Comparative Example 3

See Table 2 for the contents of individual components in this Comparative Example.

The preparation method of the detergent tablets of this Comparative Example was performed as follows:

1) dissolving 29.5 kg of water-soluble polymer in 60 kg of deionized water, heating to 80° C.-90° C., stirring evenly to obtain a film forming solution for detergent tablets;

2) add 39 kg of the surfactant, 1 kg of the foaming agent preparation, 10 kg of molding aid (in particular, starch/bentonite), 0.6 kg of dye inhibitor, 1 kg of tetrasodium glutamate diacetate, 0.5 kg of essence, 0.7 kg of sodium bicarbonate and 5 kg of glycerol in turn, stirring, heating, and drying to obtain a semi-solid tablet;

3) arranging the softener preparation in the form of 5 kg solid particles on the continuously heated semi-solid tablet, drying to shape, and demoulding to obtain the solid tablet; and 4) adding 25 kg of the enzyme preparation into a mixture of glycerol, propylene glycol and water, stirring evenly to obtain the enzyme preparation solution, and spraying the enzyme preparation solution on the solid tablet to obtain the detergent tablet.

Comparative Example 4

See Table 2 for the contents of individual components in this Comparative Example.

The detergent tablets of this Comparative Example was prepared as follows:

1) dissolving 29.5 kg of the water-soluble polymer in 60 kg of deionized water, heat it to 80° C.-90° C., and stirring evenly to obtain a film forming solution for detergent tablets;

2) adding 25 kg of enzyme preparation into water, and stirring evenly to obtain an enzyme preparation solution;

3) adding the enzyme preparation solution prepared in 2) to the film forming solution prepared in 1), and adding 39 kg of the surfactant, 1 kg of the foaming agent preparation, 10 kg of molding aids (in particular, starch/bentonite), 0.6 kg of the dye inhibitor, 1 kg of tetrasodium glutamate diacetate, 0.5 kg of essence, 0.7 kg of sodium bicarbonate and 5 kg of glycerol in turn, stirring, heating and drying to obtain a semi-solid tablet; and 3) arranging the softener preparation in the form of 5 kg solid particles on continuously heated semi-solid tablet prepared in step 2), and drying to obtain the detergent tablet.

Comparative Example 7

See Table 2 for the contents of individual components in this Comparative Example.

The detergent tablets of this Comparative Example was prepared as follows:

1) dissolving 29.5 kg of the water-soluble polymer in 60 kg of deionized water, heating 80° C.-90° C., and stirring evenly to form a film forming solution for detergent tablets;

2) adding 39 kg of the surfactant, 1 kg of the foaming agent preparation, 10 kg of the molding aid (in particular, starch/bentonite), 0.6 kg of the dye inhibitor, 1 kg of tetrasodium glutamate diacetate, 0.5 kg of essence, 0.7 kg of sodium bicarbonate and 5 kg of glycerol in turn, stirring, heating and drying to obtain a semi-solid tablet;

3) arranging the enzyme preparation in the form of 25 kg solid particles on the continuously heated semi-solid tablets, drying, molding and demoulding to obtain the solid tablets;

4) adding 5 kg of the softener preparation into a mixture of glycerin and propylene glycol, stirring evenly to obtain the softener preparation solution, and spraying the softener preparation solution on the solid tablets to obtain the detergent tablets.

Comparative Example 8

See Table 2 for the contents of individual components in this Comparative Example.

The detergent tablet of this Comparative Example was prepares as follows:

1) dissolving 29.5 kg of the water-soluble polymer in 60 kg of deionized water, heating 80° C.-90° C., and stirring to form a film forming solution for detergent tablets;

2) adding 5 kg of the softener preparation into water, and stirring evenly to obtain a softener preparation solution;

3) add the softener preparation solution prepared in step 2) to the film forming solution prepared in step 1), and adding 39 kg of the surfactant, 1 kg of the foaming agent preparation, 10 kg of the molding aids (in particular, starch/bentonite), 0.6 kg of the dye inhibitor, 1 kg of tetrasodium glutamate diacetate, 0.5 kg of essence, 0.7 kg of sodium bicarbonate and 5 kg of glycerin in turn, stirring, heating and drying to obtain a semi-solid tablet;

4) arranging the softener preparation in the form of 25 kg solid particles on the semi-solid tablet prepared in the continuously heated semi-solid tablets prepared in step 2), drying to shape to obtain the detergent tablet.

Comparative Example 9

See Table 2 for the contents of individual components in this Comparative Example. The detergent tablet of this Comparative Example was prepared according to the method provided in Example 1.

Comparative Example 10

See Table 2 for the contents of individual components in this Comparative Example.

The detergent tablet of this Comparative Example was prepared as follows:

1) dissolve 29.5 kg of the water-soluble polymer in 60 kg of deionized water, heating to 80° C.-90° C., and stirring evenly to obtain a film forming solution for detergent tablets; and 2) adding 39 kg of the surfactant, 1 kg of the foaming agent preparation, 10 kg of the molding aid (in particular, starch/bentonite), 0.6 kg of the dye inhibitor, 1 kg of tetrasodium glutamate diacetate, 0.5 kg of essence, 0.7 kg of sodium bicarbonate and 5 kg of glycerol in turn, evenly stirring, adding 25 kg of enzyme preparation in the form of solid particles and 25 kg of softener preparation in the form of solid particles in turn, mixing evenly, heating and drying to obtain semi-solid tablets.

TABLE 1

Composition of detergent tablets in Embodiments 1-8

| Type of materials | Material | Examples 1 | 2 | 3 | 4 | 5 | 6 | 7 | 8 |
|---|---|---|---|---|---|---|---|---|---|
| Water-soluble polymer | PVA | 6 | 9 | 15 | 20 | 24 | 28 | 24 | 30 |
| | PVP | 1 | 2 | 3 | 4 | 5 | 5 | 10 | 1 |
| | HPMC | 1 | 0.8 | 0.6 | 0.5 | 0.5 | 0.5 | 2.5 | 3 |
| Anionic surfactant | SDS | 12 | 15 | 16 | 20 | 24 | 30 | 24 | 24 |
| | AOS | 0 | 3 | 3 | 2 | 4 | 6 | 4 | 4 |
| | LAS | 0 | 0 | 3 | 1 | 0 | 0 | 0 | 0 |
| | AES | 0 | 2 | 2 | 1 | 2 | 0 | 2 | 2 |
| Nonionic surfactant | Fatty alcohol polyoxyethylene ether AEO9 | 2 | 0 | 2 | 2 | 3 | 4 | 3 | 3 |
| | Fatty acid methyl ester ethoxy compound FMEE | 0 | 0 | 1 | 2 | 3 | 4 | 3 | 3 |
| | Iso tridecanol polyoxyethylene ether 1309L | 0 | 4 | 1 | 2 | 3 | 6 | 3 | 3 |
| Dye inhibitor | | 0.1 | 0.4 | 0.4 | 0.5 | 0.6 | 1 | 0 | 0.2 |
| Foaming agent preparation | | 1 | 2 | 3 | 5 | 6 | 7 | 10 | 6 |
| Foam promoter | Sodium bicarbonate | 0.2 | 0.4 | 0.5 | 0.6 | 0.7 | 1 | 0 | 0 |
| Enzyme preparation | Preparation A | 2 | 5 | 0 | 5 | 0 | 0 | 40 | 50 |
| | Preparation B | 0 | 0 | 15 | 0 | 25 | 15 | 0 | 0 |
| Softener preparation | | 2 | 5 | 3 | 10 | 5 | 5 | 50 | 30 |
| Other additives | Tetrasodium glutamate diacetate | 1 | 2 | 2 | 1 | 1 | 1 | 1 | 0 |
| | Essence | 0.2 | 0.2 | 0.2 | 0.5 | 0.5 | 0.5 | 0 | 0.5 |
| | Glycerol | 3 | 3 | 5 | 3 | 5 | 5 | 0 | 0 |
| Molding aids | Starch/bentonite | 5 | 0 | 6 | 0 | 10 | 0 | 10 | 10 |
| Deionized water | | 50 | 50 | 60 | 60 | 60 | 60 | 60 | 60 |

TABLE 2

Composition of detergent tablets in Comparative Examples 1-10

| Types of materials | Materials | Comparative Example 1 | 2 | 3 | 4 | 5 | 6 | 7 | 8 | 9 | 10 |
|---|---|---|---|---|---|---|---|---|---|---|---|
| Water-soluble polymer | PVA | 24 | 24 | 24 | 24 | 24 | 24 | 24 | 24 | 24 | 24 |
| | PVP | 5 | 5 | 5 | 5 | 5 | 5 | 5 | 5 | 5 | 5 |
| | HPMC | 0.5 | 0.5 | 0.5 | 0.5 | 0.5 | 0.5 | 0.5 | 0.5 | 0.5 | 0.5 |
| Anionic surfactant | SDS | 24 | 24 | 24 | 24 | 24 | 24 | 24 | 24 | 24 | 24 |
| | AOS | 4 | 4 | 4 | 4 | 4 | 4 | 4 | 4 | 4 | 4 |
| | LAS | 0 | 0 | 0 | 0 | 0 | 0 | 0 | 0 | 0 | 0 |
| | AES | 2 | 2 | 2 | 2 | 2 | 2 | 2 | 2 | 2 | 2 |
| Nonionic surfactant | Fatty alcohol polyoxyethylene ether AEO9 | 3 | 3 | 3 | 3 | 3 | 3 | 3 | 3 | 3 | 3 |
| | Fatty acid methyl ester ethoxy compound FMEE | 3 | 3 | 3 | 3 | 3 | 3 | 3 | 3 | 3 | 3 |
| | Iso tridecanol polyoxyethylene ether 1309L | 3 | 3 | 3 | 3 | 3 | 3 | 3 | 3 | 3 | 3 |

TABLE 2-continued

Composition of detergent tablets in Comparative Examples 1-10

| Types of materials | Materials | Comparative Example 1 | 2 | 3 | 4 | 5 | 6 | 7 | 8 | 9 | 10 |
|---|---|---|---|---|---|---|---|---|---|---|---|
| Dye inhibitor | | 0.6 | 0.6 | 0.6 | 0.6 | 0.6 | 0.6 | 0.6 | 0.6 | 0.6 | 0.6 |
| Foaming agent preparation | | 6 | 6 | 6 | 6 | 6 | 6 | 6 | 6 | 0 | 6 |
| Foam promoter | Sodium bicarbonate | 0.7 | 0.7 | 0.7 | 0.7 | 0.7 | 0.7 | 0.7 | 0.7 | 0.7 | 0.7 |
| Enzyme preparation B | | 0 | 70 | 25 | 25 | 25 | 25 | 25 | 25 | 25 | 25 |
| Softener preparation | | 5 | 5 | 5 | 5 | 0 | 70 | 5 | 5 | 5 | 5 |
| Other additives | Tetrasodium glutamate diacetate | 1 | 1 | 1 | 1 | 1 | 1 | 1 | 1 | 1 | 1 |
| | Essence | 0.5 | 0.5 | 0.5 | 0.5 | 0.5 | 0.5 | 0.5 | 0.5 | 0.5 | 0.5 |
| | Glycerol | 5 | 5 | 5 | 5 | 5 | 5 | 5 | 5 | 5 | 5 |
| Molding aids | Starch/bentonite | 10 | 10 | 10 | 10 | 10 | 10 | 10 | 10 | 10 | 10 |
| Deionized water | | 60 | 60 | 60 | 60 | 60 | 60 | 60 | 60 | 60 | 60 |

Performance Test

1. Stability of enzyme preparation particles and softener preparation particles: the detergent tablets were placed in a test environment with temperature of (25±2° C.) and humidity of (40±5)%, kept for 48 hours, then picked up by hand, turned over, and rubbed properly, while observing whether the enzyme preparation particles and the softener preparation particles on the detergent tablets fall off. The results are shown in Table 3.

2. Humidity resistance stability: two detergent tablets were stacked and placed in a test environment with a temperature of (25±2° C.) and humidity of (85±5)% for 24 h, and then the two detergent tablets were separated, while observing whether there was any adhesion, divided into no adhesion, slight adhesion and obvious adhesion, between tablets. The results are shown in Table 3.

3. Detergency test: the test was performed according to the evaluation method in GB/T 13174-2021 Determination of Detergency and cycle of washing property for laundry detergents in combination with the evaluation standard of QB/T 1224-2012 Liquid Detergents for fabric, with a test concentration of the standard laundry detergent of 0.2%, and a test concentration of the sample of 0.013% (the test concentration was 1/15 of the standard laundry detergent).

3.1 Whiteness Measurement:

JB-01 stained cloth, JB-02 stained cloth and JB-03 stained cloth were cut into a size of 6 cm*6 cm, and were classified into six groups each having a similar blackness. Each group of the test cloths was used for testing the performance of a same sample.

Whiteness values before and after washing were read by using a whiteness meter one by one at 457 nm. Two points were selected on both sides of the test cloths before washing (the two points on each side were center symmetrical to each other) and measured in terms of whiteness values, in which an average of four measurements was defined as whiteness F1 of the test cloth before washing. Two points were selected on both sides of the test cloths after washing (the two points on each side were center symmetrical to each other) and measured in terms of whiteness values, in which an average of four measurements was defined as whiteness F2 of the test cloth before washing.

Whiteness difference (F2-F1) of each test cloth before and after washing was calculated by one-to-one correspondence, and a detergency of each group of the test cloths was calculated.

Calculation was conducted based on different kinds of the test cloths, and a detergency R and detergency ratio P achieved by a detergent on individual stained cloths were determined as follow.

3.2 Calculation of Detergency Value of a Stained Cloth

The detergency value Ri=ΣF2i−F1i)/n;

where:

i—Type $i^{th}$ stained test cloth;

F1i—spectral reflectance of the type $i^{th}$ stained test cloth before washing, %;

F2i—spectral reflectance of the type $i^{th}$ stained test cloth after washing, %;

n—effective content of each group of stained test cloth.

One decimal place was kept for the results.

3.3 Calculation of Detergency Ratio of Stained Cloths

The detergency ratio Pi=R3i/R0i of a relative standard laundry detergent on the type $i^{th}$ stained cloth;

where:

R0i—detergency value of a standard laundry detergent, %;

R3i—detergency value for the sample.

One decimal place was kept for the results.

3.4 Determination of Detergency of a Detergent

When Pi≥1.0, it is determined that "the detergency of the sample to the type $i^{th}$ stained cloth is equal to or better than that of the standard laundry detergent", which is briefly referred to as "qualified detergency for the type $i^{th}$ stained cloth"; and When Pi<1.0, it is determined that "the detergency of the sample to the type $i^{th}$ stained cloth is inferior to that of the standard laundry detergent", which is briefly referred to as "unqualified detergency for the type $i^{th}$ stained cloth".

The results are shown in Table 4.

4. Antistatic property test: according to QB/T 4535-2013 Fabric softener standard, the anti-static property of the detergent tablets was tested, with a logarithm difference of surface specific resistances $\Delta lg\rho_s \geq 2.5$ being determined as qualified. The results are shown in Table 4. Table 3 Test results of particle stability and moisture resistance of detergent tablets prepared in Examples and Comparative Examples

| | Particle stability | 24 h Moisture resistance | 48 h Moisture resistance |
|---|---|---|---|
| Example 1 | No falling off | No adhesion | Slight adhesion |
| Example 2 | No falling off | No adhesion | Slight adhesion |
| Example 3 | No falling off | No adhesion | Slight adhesion |
| Example 4 | No falling off | No adhesion | No adhesion |
| Example 5 | No falling off | No adhesion | Slight adhesion |
| Example 6 | No falling off | No adhesion | No adhesion |
| Example 7 | No falling off | No adhesion | Slight adhesion |
| Example 8 | No falling off | No adhesion | Slight adhesion |
| Comparative Example 1 | No falling off | No adhesion | Slight adhesion |
| Comparative Example 2 | No falling off | Slight adhesion | Obvious adhesion |
| Comparative Example 3 | — | Obvious adhesion | Obvious adhesion |
| Comparative Example 4 | — | Obvious adhesion | Obvious adhesion |
| Comparative Example 5 | No falling off | No adhesion | No adhesion |
| Comparative Example 6 | No falling off | No adhesion | No adhesion |
| Comparative Example 7 | — | Obvious adhesion | Obvious adhesion |
| Comparative Example 8 | — | Obvious adhesion | Obvious adhesion |
| Comparative Example 9 | Sever falling off | No adhesion | No adhesion |
| Comparative Example 10 | No falling off | No adhesion | No adhesion |

TABLE 4

Test results of detergent and anti-static properties of detergent tablets prepared Examples and in proportion

| | Detergency rate | | | | | |
|---|---|---|---|---|---|---|
| | Test concen-tration | JB-01 stained cloth | JB-02 stained cloth | JB-03 stained cloth | Test results | $\Delta lg\rho_s$ |
| Standard laundry detergent | 0.2% | 1.00 | 1.00 | 1.00 | / | / |
| Example 1 | 0.013% | 1.71 | 3.71 | 1.12 | Qualified | 3.9 |
| Example 2 | 0.013% | 1.75 | 3.82 | 1.18 | Qualified | 4.1 |
| Example 3 | 0.013% | 1.79 | 3.85 | 1.24 | Qualified | 4.3 |
| Example 4 | 0.013% | 1.77 | 3.81 | 1.20 | Qualified | 4.2 |
| Example 5 | 0.013% | 1.82 | 3.91 | 1.25 | Qualified | 4.1 |
| Example 6 | 0.013% | 1.79 | 3.85 | 1.30 | Qualified | 4.0 |
| Example 7 | 0.013% | 1.83 | 3.95 | 1.35 | Qualified | 4.6 |
| Example 8 | 0.013% | 1.86 | 3.96 | 1.36 | Qualified | 4.4 |
| Comparative Example 1 | 0.013% | 1.51 | 1.52 | 1.01 | Qualified | 4.1 |
| Comparative Example 2 | 0.013% | 1.89 | 4.03 | 1.40 | Qualified | 4.3 |
| Comparative Example 3 | 0.013% | 1.60 | 2.52 | 1.26 | Qualified | 4.2 |
| Comparative Example 4 | 0.013% | 1.56 | 2.21 | 1.24 | Qualified | 4.0 |
| Comparative Example 5 | 0.013% | 1.61 | 3.78 | 1.29 | Qualified | 1.3 |
| Comparative Example 6 | 0.013% | 1.65 | 3.94 | 1.36 | Qualified | 4.9 |
| Comparative Example 7 | 0.013% | 1.03 | 1.23 | 0.98 | Unqualified | 2.0 |
| Comparative Example 8 | 0.013% | 1.02 | 1.21 | 0.96 | Unqualified | 1.9 |
| Comparative Example 9 | 0.013% | 1.13 | 1.33 | 0.99 | Unqualified | 2.0 |
| Comparative Example 10 | 0.013% | 1.62 | 3.32 | 1.10 | Qualified | 3.8 |

It can be seen from the data in Table 4 that, with the increase of the content of the enzyme preparation, the detergency rate and, in turn, detergency performance of JB-01, JB-02 and JB-03 stained cloths increase gradually. In the Comparative Example 2, the content of enzyme preparation is large (70 kg), but the improvement in detergency is not obvious compared with that in Example 8 (the content of the enzyme preparation is 50 kg). When the added amount of the enzyme preparation is within the range of 0.1-50 kg, the detergency will increase significantly with the increase of the content of the enzyme preparation, especially for JB-02 stained cloth with more protein stains, for which the content of the enzyme preparation has a significant impact on the detergency.

In the Comparative Example 3 in which the enzyme preparation is added by preparing into a liquid and then sprayed onto the solid detergent tablets, the detergency rate for JB-02 dirty cloth is only 2.52, which, however, is 3.95 for JB-02 dirty cloth in Example 1 with the same enzyme preparation content. It can be seen that, the detergency rate is much lower than that of the detergent tablets with granular enzyme preparation. This is because the exposed liquid enzyme preparation is easily affected by the environmental temperature and humidity, thus affecting the detergency. In Comparative Example 4 in which the enzyme preparation in liquid form is directly mixed with other components of the detergent tablets, dried and shaped, the detergency rate for JB-02 dirty cloth is only 2.21, which, however, is 3.95 for JB-02 dirty cloth in Example 1 with the same enzyme preparation content. It can be seen that, the detergency is much lower than that of the detergent tablets using particular enzyme preparation. This is because directly incorporating the liquid enzyme preparation into the detergent tablets and the drying and shaping processes of the detergent tablets will inactivate some of the enzymes, thus impairing the detergency of the obtained detergent tablets.

In Comparative Examples 3-4 incorporating the enzyme preparation in liquid form, the stability test shows obvious adhesion in the 24 h and 48 h moisture resistance stability. The detergent tablets in Examples 1-8 show good stability.

It can be seen from the data in Table 4 that, with the increase of the content of the softener preparation, the antistatic performance of the fabric washed with the detergent tablets gradually increases. In the Comparative Example 6, the amount of softener particles is large (70 kg), but the antistatic performance is not significantly improved compared with that Example 7 added with 50 kg softener preparation.

In Comparative Example 7 in which the softener is sprayed on the semi-solid detergent tablets in liquid form, it can be seen from the data in Table 4 that the antistatic performance of the fabric washed with the detergent tablets of Comparison Example 7 is only 2.0. In addition, the detergent tablets in proportion 7 has a significantly weaker detergency than that of the detergent tablets containing the same amount of softener preparation in Example 1. In the Comparative Example 8 in which the softener is directly added into the detergent tablets with other ingredients in liquid form, it can be seen from the data in Table 4 that the antistatic performance of the fabric washed with the detergent tablets of Comparison Example 8 is only 2.0, which is unqualified. In addition, the detergency of the detergent tablets in Comparison Example 8 is significantly lower than that of the detergent tablets in Example 1 with the same amount of softener preparation. This is because the surfactant used in examples of the present application is anionic and non-ionic surfactant, and the softener as used contains cationic surfactant. Incorporating the softener preparation by spraying or directly mixing with other components of the detergent tablets will lead to a situation where the softener directly contacts the surfactant, and thus, the cationic surfactant and the anionic surfactant will be precipitated due to a electrostatic adsorption therebetween, weakening the efficacy of the two surfactants. In Example 1, owing to high molecular weight of polyethylene glycol/polypropylene glycol, the polyethylene glycol/polypropylene glycol and the cationic softener components encapsulated by them were slowly dissolved, and thus a mutual influence caused by precipitation due to electrostatic adsorption with strong anion detergent components in the first washing procedure can be avoided. After the tablets containing anionic detergent ingredients and the immobilized enzyme preparations were dissolved to wash clothes, the polyethylene glycol/polypropylene glycol and the encapsulated cationic softener ingredients begin to be dissolved in a rinsing procedure and release the cationic softener ingredients to contact the clothes. It can not only neutralize residual anionic detergent on clothes in time, but also make clothes cleaned by the detergent quickly repaired by the softener. It can really achieve the effect of washing, cleaning, protecting and softening clothes.

For the Comparative Examples 7-8 in which the softener preparation is incorporated in liquid form, obvious adhesion was observed in the 24 h and 48 h moisture resistance stability. In Comparative Example 9, no foaming agent was added, the overall structure of the detergent tablets was relatively compact and not loose enough, suffering from falling off of a large number of enzyme preparation particles and softener particles. Compared with Example 5 containing foaming agent but having the same composition, the detergency and antistatic properties are much weaker. This is because the foaming agent can loosen the internal structure of a slurry, so that the molecular chain of the water-soluble polymer forming the film can be easily broken or untied in the slurry containing water, so that the addition of auxiliary ingredients in the detergent tablet composition will not affect the stability and falling off property of the washing particle composition and the solid phase softener preparation.

In Comparative Example 10, the enzyme preparation particles and the softener preparation particles are directly mixed with other components of the detergent tablet to prepare the detergent tablet in which the enzyme preparation particles and the softener preparation particles are completely embedded. The components of the detergent tablet in Comparative Example 10 are identical to those in the example 5, but the difference is only in the position of the enzyme preparation particles and the softener preparation particles in the detergent tablets. In Example 5, the particles were embedded on the detergent tablets, while in Comparative Example 10, the particles were embedded evenly in the detergent tablets. It can be seen from the results of detergency and anti-static performance tests in Table 4 that, the detergent tablets in Comparative Example 10 has poor detergency and anti-static performance. The reason lies in that, providing enzyme preparation particles and softener preparation particles on the surface of the detergent tablet can make the particles contact with water earlier and dissolve quickly, which can quickly play its detergent effect and anti-static effect. In Comparative Example 10, the particles are evenly embedded in the detergent tablets. Therefore, the enzyme preparation particles and the softener preparation particles will be released only after the detergent tablets are completely dissolved, and then contact with water to serve their detergent and anti-static effects. In the fast washing mode of the washing machine, providing enzyme preparation particles and softener preparation particles inserted on the detergent tablets achieved more obvious advantages.

The specific embodiments are only an explanation of the present application, not intended to impose any limitation to the present application. A person skilled in the art, if necessary, can make modifications to the present embodiment without paying creative labors after reading this specification, which, as long as falling within the scope of the claims of the present application, is protected by the patent law.

What is claimed is:

1. A detergent tablet, comprising the following components by weight:
- 8-34 parts of a water-soluble polymer;
- 14-50 parts of a surfactant;
- 0.1-50 parts of an enzyme preparation;
- 0.1-50 parts of a softener preparation;
- 1-10 parts of a foaming agent preparation; and
- 0-30 parts of molding aids;
- wherein the enzyme preparation and the softener preparation are embedded on a surface of the detergent tablet in a form of solid particles;
- wherein the softener preparation comprises the following components by weight:
  - 3-60 parts of polyethylene glycol/polypropylene glycol;
  - at least one of 1-60 parts of a cationic softener or 1-10 parts of a silicone softener;
  - 1-90 parts of bentonite;
  - 1-50 parts of starch; and
  - 1-10 parts of dextrin;
- wherein a weight average molecular weight of the polyethylene glycol/polypropylene glycol is 3000-20000.

2. The detergent tablet according to claim 1, wherein the water-soluble polymer is one or more selected from a group consisting of polyvinyl alcohol, polyvinylpyrrolidone, gelatin, carrageenan, polycrosslinked acrylate, water-soluble polyacrylamide, polymer of vinyl acetate and vinyl alcohol, starch, dextrin, polysaccharide, cellulose, modified cellulose, and microcrystalline cellulose.

3. The detergent tablet according to claim 1, wherein the surfactant is one selected from a group consisting of an anionic surfactant and a non-ionic surfactant, or a combination thereof.

4. The detergent tablet according to claim 1, wherein the enzyme preparation is one or more selected from a group consisting of protease, amylase, lipase, cellulase, mannanase, pectin lyase, papain, oxidoreductase, and glycoside hydrolase.

5. The detergent tablet according to claim 1, wherein particles of the enzyme preparation have an average particle size of 0.01 mm-3.0 mm.

6. The detergent tablet according to claim 1, wherein the foaming agent preparation comprises the following parts by weight:

1-4 parts of potassium laurate;

6-14 parts of dodecylbenzene sulfonate triethylamine (TEA) salt;

2-8 parts of C12-C16 olefin sulfonate;

5-11 parts of polyoxyethylene alkyl ether phosphate triethanolamine salt;

6-14 parts of alkyl glycosides;

2-6 parts of cocoamide propyl hydroxysulfobetaine; and 30-90 parts of deionized water.

7. The detergent tablet according to claim 1, wherein the detergent tablet further comprises one or more selected from a group consisting of dye inhibitor, essence, glycerin, propylene glycol, butanediol, pentanediol, mannitol, hydroxyethyl urea, glycerol glucoside, tetrasodium glutamate diacetate, sodium bicarbonate, sodium iminodisuccinate, sodium polyaspartate, sodium polyepoxysuccinate and trisodium methylglycine diacetate.

8. The detergent tablet according to claim 1, wherein the water-soluble polymer comprises at least one of polyvinyl alcohol, polyvinyl pyrrolidone, hydroxypropyl methyl cellulose or hydroxyethyl cellulose.

* * * * *